Sept. 8, 1959  F. J. SMITH  2,902,840
EVAPORATOR ASSEMBLY FOR A VEHICLE
Filed May 18, 1956  2 Sheets-Sheet 1
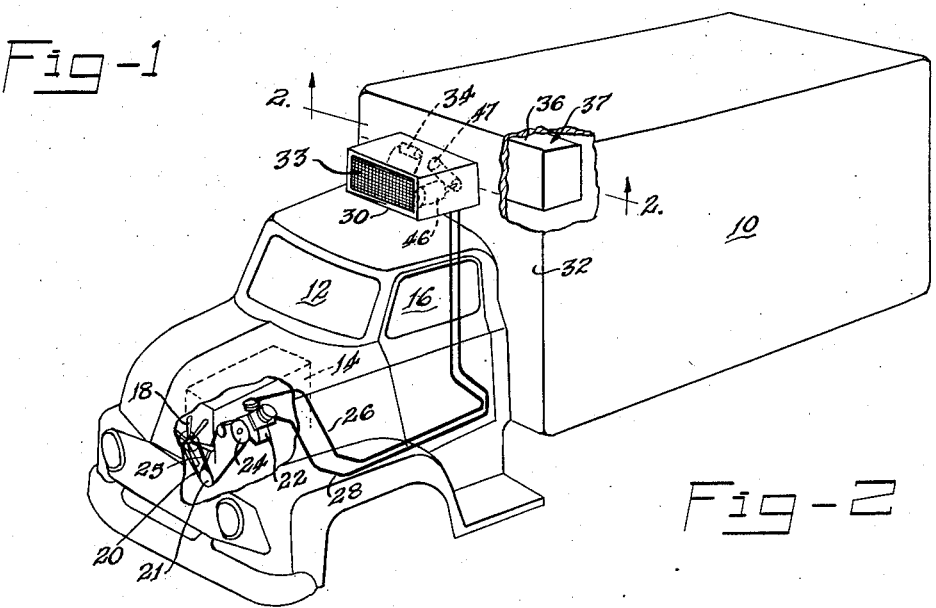
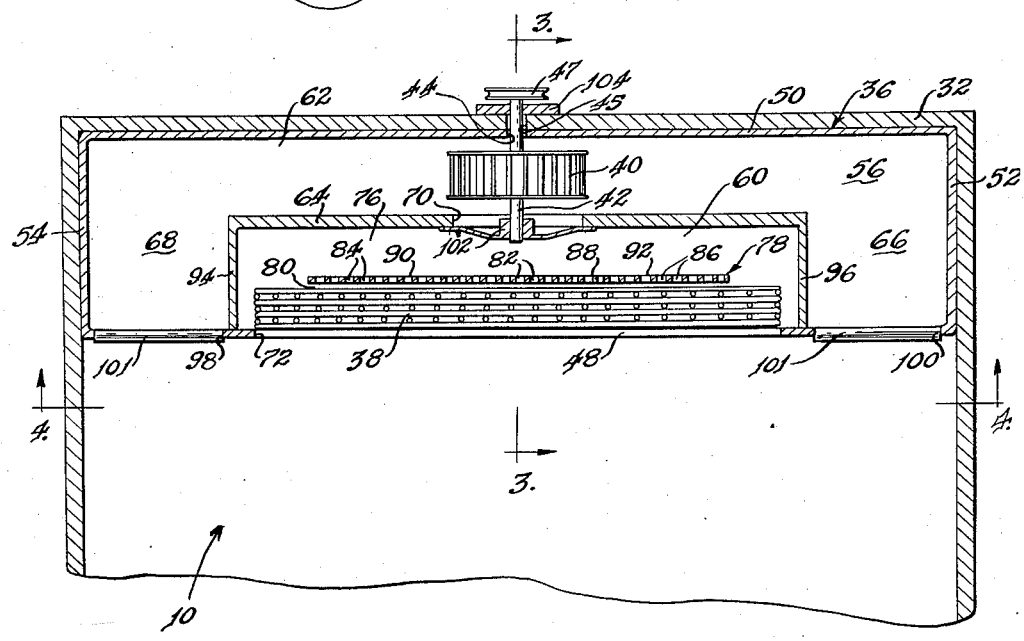
INVENTOR.
Francis J. Smith
BY
Marshall A. Burmeister
Attorney Sept. 8, 1959 F. J. SMITH 2,902,840
EVAPORATOR ASSEMBLY FOR A VEHICLE
Filed May 18, 1956 2 Sheets-Sheet 2
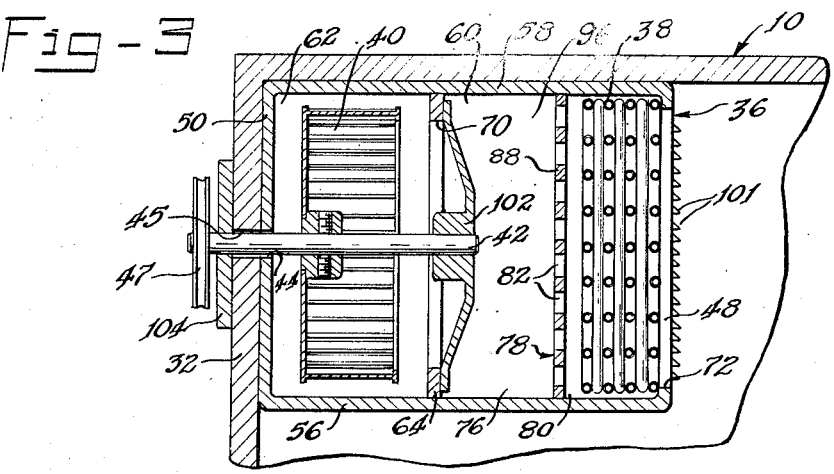
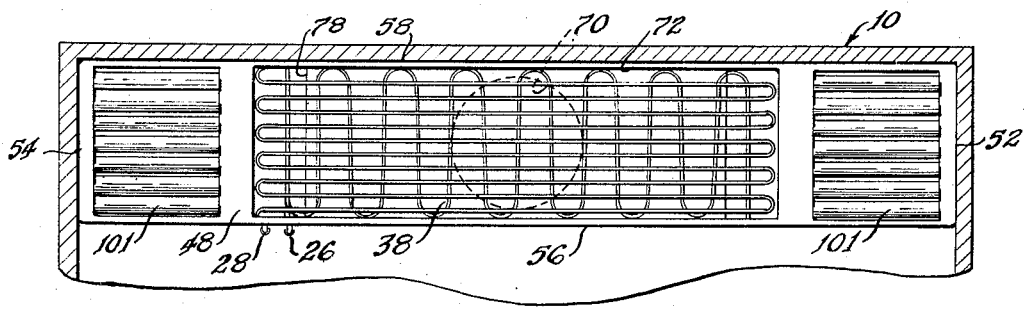
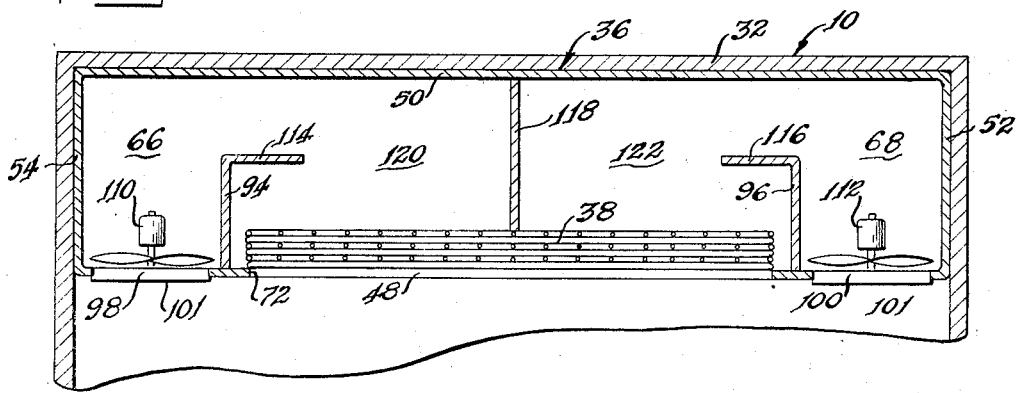
INVENTOR.
Francis J. Smith
BY
Marshall A. Burmeister
Attorney

United States Patent Office 2,902,840
Patented Sept. 8, 1959

2,902,840

EVAPORATOR ASSEMBLY FOR A VEHICLE

Francis J. Smith, Chicago, Ill.

Application May 18, 1956, Serial No. 585,865

4 Claims. (Cl. 62—407)

The present invention relates generally to devices for space refrigeration, and more particularly to devices for refrigerating moving vehicles.

It has become relatively common practice to provide moving vehicles with space refrigeration. The cargo space of motor trucks has long been refrigerated in order to prevent spoilage of perishable commodities. More recently, the passenger compartment of passenger vehicles has also been refrigerated.

The conventional truck refrigeration system employs a compressor mounted adjacent to the engine of the truck and mechanically coupled to the engine in order to provide the compressor with rotational power. Generally, an interior, or evaporator, assembly which includes the evaporator coil and a means for moving the air through the evaporator coil is mounted within the cargo space of the vehicle and provided with a drive shaft which extends to the exterior of the cargo space through an aperture in the wall thereof. An exterior assembly including an electric or hydraulic motor is mounted exterior to the cargo space and coupled to this shaft. The expander is also mounted in the exterior assembly.

Conventional evaporator assemblies employ a fan which directs air through a relatively thick evaporator coil. The evaporator coil is generally of square cross section, or rectangular cross section if two fans are employed. The assembly is generally mounted to the front wall of the cargo space of the truck adjacent to the roof of the truck and extends a considerable distance into the cargo space. As a result, a portion of the cargo space is lost for its intended purpose due to the bulk and size of the evaporator assembly. It is one of the objects of the present invention to provide an evaporator assembly which fills less of the cargo space of the vehicle than the conventional evaporator assemblies.

Considerable difficulty has also been experienced in distributing the refrigerated air throughout the cargo space of the vehicle. In those units which employ a fan to push air directly through the evaporator coil and into the cargo space, the cargo space cannot be completely packed to the roof of the truck, since air must pass down the center of the truck. Further, a single quite cold beam of air passes essentially down the center of the truck and is required to diffuse throughout the truck. It is a further object of the present invention to provide an evaporator assembly which provides better distribution of the refrigerated air within the cargo space of the vehicle.

These and other objects of the present invention will be more fully understood from a further reading of this disclosure, particularly when viewed in the light of the drawings, in which:

Figure 1 is an isometric view, partly diagrammatic, of a motor vehicle provided with a refrigeration device constructed according to the teachings of the present invention;

Figure 2 is a sectional view taken along the line 2—2 of Figure 1;

Figure 3 is a sectional view taken along the line 3—3 of Figure 2;

Figure 4 is a sectional view taken along the line 4—4 of Figure 2; and

Figure 5 is a horizontal sectional view of another embodiment of the invention taken along a line similar to that of Figure 2.

Figure 1 illustrates the present invention as applied to the cargo space of a motor truck, although it is to be understood that the present invention could also be equally well applied to the passenger compartment of a passenger vehicle. As illustrated, the truck has a cargo box 10 secured behind a cab 12. The cab 12 is provided with a motor 14 in front of a passenger compartment 16, and the motor 14 is provided with a fan 18 which is driven by a fan belt 20 by a pulley 21 coupled to the motor 14. A compressor 22 is mounted to the motor 14 and has a pulley 24 which engages a belt 25 coupled to the pulley 21 of the motor 14. In this manner, operation of the motor 14 rotates the pulley 24 and drives the compressor 22.

A pair of lines 26 and 28 extend between the compressor 22 and an exterior assembly 30 mounted to the exterior surface of the front wall 32 of the cargo box 10. The assembly 30 includes a heat exchanger 33 for transferring thermal energy to the atmosphere and a dehydrator 34.

A rectangular container 36 is mounted to the interior surface of the front wall 32 of the cargo box 10 and is a part of an evaporator assembly 37 which includes an evaporator coil 38 mounted within the container 36. The ends of the evaporator coil 38 are connected to the lines 26 and 28, the lines 26 and 28 extending through the wall 32 of the cargo box 10. A fluid impeller 40 is also mounted within the container 36 and has a shaft 42 which extends through an aperture 44 in the container 36 and an aperture 45 in the front wall 32 to enter the exterior assembly 30. A pump motor 46 is also disposed within the exterior assembly 30 and connected with the shaft 42 through a pulley 47 to drive the impeller 40. The pump motor 46 may either be electric or hydraulic, and if hydraulic, a hydraulic pump must be coupled to the engine 14 of the vehicle.

The container 36 is rectangular in shape and has a front wall 48, a back wall 50 parallel to the front wall, end walls 52 and 54, a bottom wall 56, and a top wall 58. The container 36 is divided into two chambers 60 and 62 by a wall partition 64 which extends between the top wall 58 and the bottom wall 56 parallel to the front and back walls 48 and 50. The wall 64 does not extend to the end walls 52 and 54, but provides gaps 66 and 68 between the wall 64 and the ends 52 and 54.

The wall 64 is also provided with a central aperture 70 which is annular in shape, and as will be hereinafter described, this aperture 70 is a flow restricting orifice. The front wall 48 of the container 36 is provided with an opening 72 which is rectangular in shape and generally confronts the wall 64. The evaporator coil 38 is mounted to confront the opening 72, and essentially fills the opening 72. The coil 38 is rectangular in shape and relatively thin compared to the evaporation coils generally employed for refrigerating cargo spaces of equal sizes. As a result, the evaporation coil 38 has a relatively small static pressure drop.

The coil 38 is spaced from the wall 64 to provide a channel 76 therebetween. Also, a baffle plate 78 is mounted adjacent to the coil 38 in the channel 76, a narrow channel 80 being provided between the baffle plates 78 and the coil 38. The baffle plate 78 extends across the central 80% of the surface of the evaporator coil 38, the outer edges of the evaporator coil 38 having free access to the channel 76. The baffle plate 78 is provided with a plurality of flow regulating apertures 82, 84, and 86, the apertures 82 in the central portion 88 of the plate being smaller than the apertures 84 and 86 in the end portions 90 and 92, respectively, of the plate. Each of the portions 88, 90, and 92 are of approximately equal size.

In the particular construction described herein, the apertures 82 in the central portion 88 are each ⅜ inch in diameter and spaced from each other by ¼ inch, while the apertures 84 and 86 are each ½ inch in diameter and spaced from each other by ¼ inch. In this manner, the flow of air through the central portion 88 of the baffle plate 78 is more restricted than the flow of air through the portions 90 and 92, while the flow of air through the uncovered portions of the evaporator coil 38 is unrestricted.

A pair of plates 94 and 96 extend from the ends of the front plate 64 to the front wall 48 and are sealed to the front wall adjacent to the opening 72 and to the plate 64, top wall 58 and base wall 56 of the compartment. A pair of exhaust ports 98 and 100 are disposed in the front wall 48 of the container 36 between the plates 94 and 96 and the ends 52 and 54. In this manner, a pair of exhaust channels are formed from the impeller 40 through the chamber 62, the gaps 66 and 68, and the exhaust ports 98 and 100. Each of th exhaust ports 98 and 100 is provided with a louvered plate 101 which permits air passage and prevents bodies from entering the container 36.

The shaft 42 for the impeller 40 is mounted on a bearing 102 disposed centrally of the opening 70, and a second bearing 104 which is mounted to the exterior surface of the cargo box 10. In this manner, the evaporator assembly 37 may be placed within the cargo box 10 without aligning the impeller 40 with three bearings, the third bearing being desirable to seal the aperture 45 in the front wall 32 of the cargo box 10.

In the particular construction described herein, the container 36 extends completely across the cargo box 10 of the vehicle and has a longitudinal dimension of 74 inches, a depth of 15 inches and a height of 12 inches. The evaporator coil 38 is approximately 62 inches long, approximately 12 inches high, and approximately 4½ inches deep, and the channel 76 between the evaporator coil 38 and the wall 64 is approximately 4¾ inches deep. The chamber 62 is approximately 5 inches deep and extends across the entire container 36. The exhaust ports 98 and 100 are each 6 x 10 inches, and the distance between the ends 52 and 54 and the plates 94 and 96 is approximately 6 inches. The aperture 70 is 10 inches in diameter, and the impeller 40 is 11 inches in diameter and 3 inches in depth. The baffle plate 78 is disposed approximately ½ inch from the coil 74, and the channel 80 is approximately ½ inch thick. The wall 64, baffle plate 78, and container 36 are all constructed of 14 gauge galvanized sheet metal.

The capacity of the refrigeration system described above is determined by the size of the compressor, as in all refrigeration systems. The evaporator assembly here disclosed may be substituted for a conventional evaporator assembly. The amount of cooling which may be provided by the refrigeration system employed determines the temperature differential between the air entering the evaporator coil 38 and the air passing through the opening 70. This temperature differential is a function of the magnitude of the air flow for a given capacity refrigeration system. In the particular construction described, the air flow is 1,000 cubic feet per minute. This air flow may be identical to that of a conventional evaporator assembly. However, since the thickness of the evaporator coil 38 is much less than conventional coils, the rate of flow through a given area of the coil 38 must be reduced from conventional flow rates.

The inventor has found that the cross sectional area of the coil 38 must be at least five times that of the cross sectional area of the flow restricting orifice of the unit, in the present instance the aperture 70. Also, the present invention produces the greatest advantage if the cross sectional area of the evaporator coil 38 is at least 9 to 10 times the cross sectional area of the flow restricting orifice. As a result of this construction, a large area evaporator coil is provided, thus permitting a long evaporator coil of little thickness and moderate height which may be positioned adjacent to the top of the cargo box 10 of the vehicle, thereby utilizing space which is difficult to use for cargo. In addition, with this construction the refrigerated air emerges at the two corners in the front of the cargo box adjacent to the roof thereof. As a result, the center of the cargo box may be packed higher than with conventional devices, and the air is free to circulate backward in the cargo box of the vehicle along the corner of the roof and the sides of the box, this space being of little value in cargo handling. Due to the fact that cold air tends to fall, good air distribution is obtained in this maner.

A second embodiment of the invention is illustrated in Figure 5. This embodiment is a modification of the embodiment shown in Figures 1 through 4, and the same container 36 is employed using the same dimensions. Also, the opening 72, evaporation coil 38, and exhaust ports 98 and 100 are identical to that shown in Figures 1 through 4. The fluid impeller of the former embodiment however is replaced by a pair of electrically driven fans 110 and 112 positioned adjacent to the outlet ports 98 and 100, respectively. Further, the exhaust ports 98 and 100 form the flow restricting orifices in this construction, since the wall 64 is largely omitted. The plates 94 and 96 are employed, however short wall sections 114 and 116 extend from the plates 94 and 96 toward the center of the container 36. A divider 118 extends from the back wall 50 to the coil 38. The coil 38 is spaced from the sections 114 and 116 forming short channels 120 and 122.

In operation, the fans 110 and 112 exhaust air from the interior of the container 36, each fan exhausting air from approximately one-half of the interior of the container 36. The air enters through the opening 72, flows through half of the coil 38, thence between the back wall 50 and wall segments 114 and 116 through the gaps 66 and 68, respectively. The air then flows past the fans 110 and 112 out of the ports 98 and 100.

In this embodiment it is also true that the cross sectional area of the coil 38 is at least five times that of the flow restricting orifices, here the exhaust ports 98 and 100.

The man skilled in the art will readily devise many modifications and additional embodiments within the scope of the present invention. For example, the present invention may clearly be applied to the passenger compartment of a passenger vehicle, either by incorporating the evaporator assembly in the dashboard of the vehicle or behind the rear seat of the vehicle. It is therefore intended that the present invention be not limited by the foregoing disclosure, but rather only by the appended claims.

The invention claimed is:

1. An evaporator assembly comprising an elongated air impermeable generally rectangular container, said container having a bottom wall and a top wall parallel thereto, a front wall and a back wall parallel thereto, and parallel end walls, a wall partition disposed parallel to the front wall and back wall between the top wall and bottom wall, said wall having a flow restricting central aperture therein and being spaced from the end walls of the container, a pair of parallel plates sealed to the ends of the wall partition and to the front wall of the container, said plates also being sealed to the top wall and bottom wall of the container, the front wall of said container having an opening therein confronting the wall partition and a pair of ports therein between the plates and the end walls of the container, an elongated coil mounted between the opening in the front wall and the wall partition, said coil being spaced from the wall partition forming a channel, the cross sectional area of the coil being at least 5 times the cross sectional area of the flow restricting aperture in the wall partition, and a squirrel cage fluid impeller rotatably mounted adjacent to the flow restricting aperture in the wall partition.

2. An evaporator assembly comprising the elements of claim 1 in combination with a baffle plate disposed between the evaporator coil and the wall partition, said baffle plate having a plurality of apertures therein for restricting the flow through the portions of the coil directly confronting the flow restricting aperture.

3. An evaporator assembly comprising an air impermeable container approximately 74 inches long, 15 inches deep, and 12 inches high having a bottom wall and top wall parallel thereto, a front wall and a back wall parallel thereto, and parallel end walls, a wall partition disposed parallel to the front wall and back wall approximately 5 inches from the back wall and extending to approximately 6 inches of the end walls, said wall partition having a flow restricting aperture approximately 10 inches in diameter, and a pair of plates disposed parallel to the end walls and sealed to the ends of the wall partition and to the front wall of the container, said plates also being sealed to the top and bottom walls of the container and the front wall of said container having a rectangular opening therein between the two plates and a pair of rectangular ports between the plates and the end walls, the opening being approximately 62 inches by 10 inches, an evaporator coil disposed in the container and confronting the opening in the front wall thereof, and a squirrel cage fluid impeller having a diameter of approximately 11 inches and a depth of approximately 3 inches rotatably disposed between the wall partition and the back wall confronting the flow restricting aperture in the wall partition on an axis normal to the wall partition.

4. An evaporator assembly comprising an elongated air impermeable generally rectangular container, said container having a bottom wall and a top wall parallel thereto, a front wall and a back wall parallel thereto, and parallel end walls, a wall partition disposed parallel to the front wall and back wall between the top wall and bottom wall, said wall having a flow restricting central aperture therein and being spaced from the end walls of the container, a pair of parallel plates sealed to the ends of the wall partition and to the front wall of the container, said plates also being sealed to the top wall and bottom wall of the container, the front wall of said container having an opening therein confronting the wall partition and a pair of ports therein between the plates and the end walls of the container, an elongated coil mounted between the opening in the front wall and the wall partition, said coil being spaced from the wall partition forming a channel, the cross sectional area of the coil being at least 5 times the cross sectional area of the flow restricting aperture in the wall partition, and air moving means disposed between the flow restricting orifice and the ports for forcing air through the ports.

References Cited in the file of this patent

UNITED STATES PATENTS

| | | |
|---|---|---|
| 1,890,888 | Sherman | Dec. 13, 1932 |
| 1,930,414 | Buhr | Oct. 10, 1933 |
| 1,942,295 | Kerr | Jan. 2, 1934 |
| 2,033,983 | Greenwald | Mar. 17, 1936 |
| 2,165,939 | Perkins | July 11, 1939 |
| 2,245,234 | Tanner | June 10, 1941 |